United States Patent [19]
Putman

[11] 3,899,216
[45] Aug. 12, 1975

[54] BRAKING SYSTEM FOR A MULTI-CAR VEHICLE

[75] Inventor: Thomas H. Putman, Pittsburgh, Pa.

[73] Assignee: Westinghouse Electric Corporation, Pittsburgh, Pa.

[22] Filed: Jan. 28, 1974

[21] Appl. No.: 437,449

[52] U.S. Cl. ............... 303/21 A; 246/182 R; 303/7; 303/24 A
[51] Int. Cl.² .......................................... B60T 8/14
[58] Field of Search.......... 303/7, 21 R, 21 A, 24 A, 303/24 BB, 20; 246/182 R

[56] References Cited
UNITED STATES PATENTS

| | | | |
|---|---|---|---|
| 2,017,792 | 10/1935 | Farmer | 303/21 A X |
| 2,716,186 | 8/1955 | Ford | 246/182 R UX |
| 3,479,094 | 11/1969 | Chouings | 303/21 A X |

Primary Examiner—Duane A. Reger
Attorney, Agent, or Firm—R. G. Brodahl

[57] ABSTRACT

In a multi-car vehicle system, there are transducer means operative with the coupler at each end of each car for sensing the coupling forces acting on the respective couplers. A common braking reference signal is applied to each of the cars, with the magnitude of the reference signal being indicative of the braking effort required for each of the cars. On a given car, the reference signal is modified an amount dependent on the coupling forces sensed. For example, if the sensed coupling forces tend to accelerate the given car, the reference signal is modified such that the brakes are released on the given car, and if the sensed coupling forces tend to decelerate the given car the reference signal is modified such that the brakes are applied on the given car.

8 Claims, 11 Drawing Figures

PATENTED AUG 12 1975 3,899,216

SHEET 4

3,899,216

BRAKING SYSTEM FOR A MULTI-CAR VEHICLE

CROSS REFERENCE TO RELATED APPLICATIONS

Reference is made to copending applications entitled "Control Valve Apparatus," Ser. No. 437,448, filed Jan. 28, 1974, on behalf of Thomas H. Putman and W. O. Osbon; and "Acceleration Controlled Braking System," Ser. No. 437,404, filed Jan. 28, 1974, on behalf of Thomas H. Putman and W. O. Osbon. Each of the referenced applications is assigned to the assignee of the present invention.

BACKGROUND OF THE INVENTION

In multi-car vehicle systems there is a problem of distributing the total braking effort between the individual cars. If each car is assumed to have its own acceleration controlled braking system, the same deceleration or braking reference signal is applied to each car. In such a system the total vehicle has the attributes of a single car however, and the braking effort of individual cars are equal only if the brake systems on the individual cars are equal. This rarely is the case, since the coefficient of friction of the individual brake shoe linings are different as are the respective masses of the individual cars. As a result the braking effort is not evenly divided among the individual cars.

According to the present invention, the coupling forces acting on each coupler at the respective ends of a given car are sensed, and the braking reference signal is modified for the given car such that if the coupling forces tend to accelerate the given car, the brakes are released on the given car, and if the coupling forces tend to decelerate the given car, the brakes are applied on the given car. In effect each car supplies its own braking effort dependent on the braking effort supplied by the other cars as indicated by the sensed coupling forces. Also, if the brakes fail on one car the remaining cars uniformly pick up the braking effort required for the disabled car as a function of the sensed coupling forces.

SUMMARY OF THE INVENTION

According to the present invention, apparatus is disclosed for controlling the application of brakes on one car of a coupled multi-car vehicle. There are means for sensing the coupling forces acting on at least one end of the one car. Included are means for one of applying the brakes on the one car if the sensed coupling forces tend to decelerate the one car, and for releasing the brakes on the one car if the sensed coupling forces tend to accelerate the one car.

DESCRIPTION OF THE PREFERRED EMBODIMENTS

Figure 1:
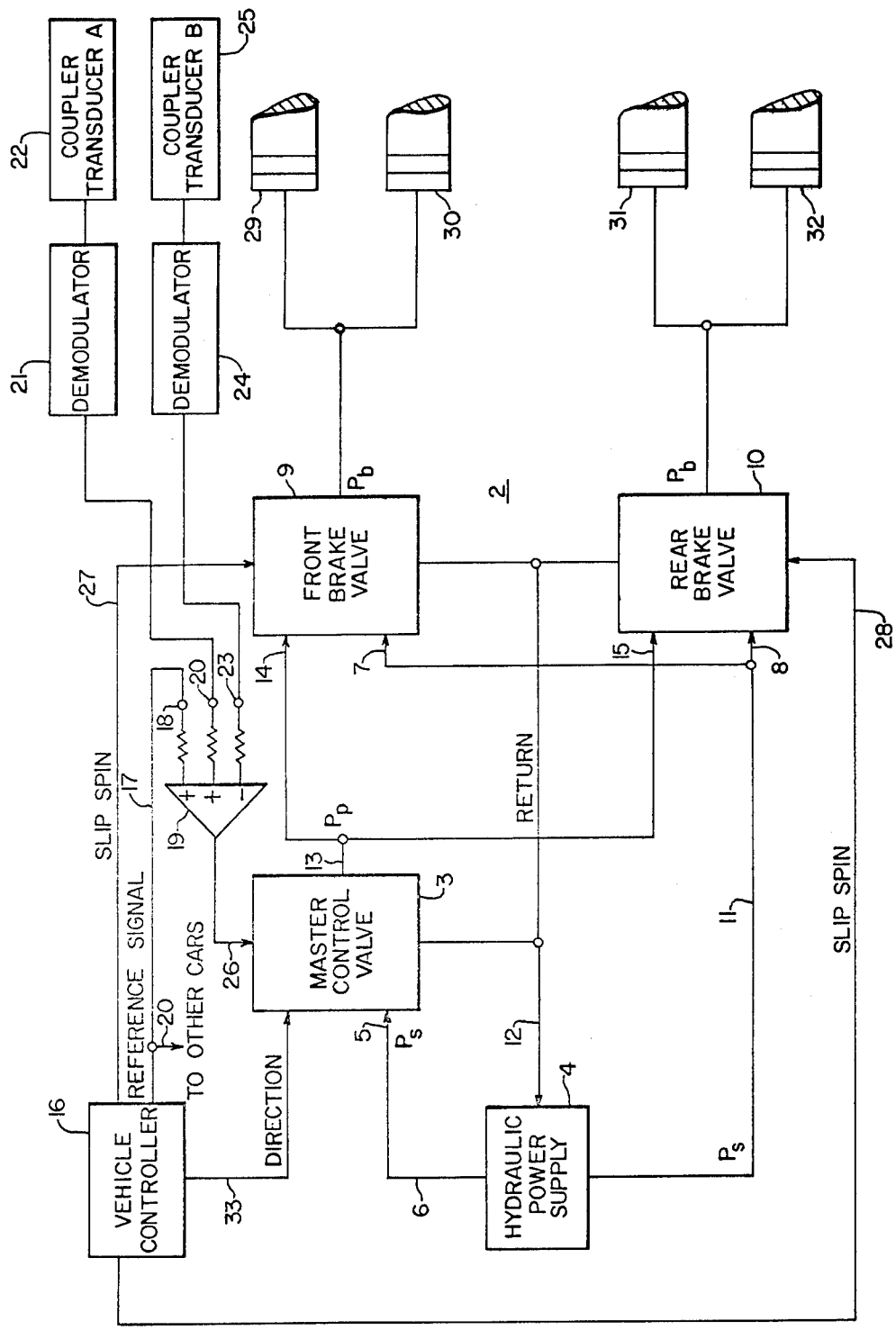
FIG. 1 is a schematic and block diagram representation of a vehicle braking system according to the present invention.

In FIG. 1 there is illustrated a vehicle braking system 2 which may be housed in one vehicle car operating alone or in a multi-car vehicle system. A master control valve 3 includes an inertial mass (not shown) which controls the application of brakes on the one vehicle car. The inertial mass, which may take the form of an inverted pendulum, is responsive to a sensed deceleration of the vehicle car as well as to a reference braking signal for controlling the application or release of the vehicle car brakes. The master control valve includes first and second valves (not shown) which respond to the movement of the inertial mass for controlling their respective valve conditions. When the inertial mass moves in one direction the first valve tends to move toward one valve condition and the second valve tends to move toward the opposite valve condition. For example, the first valve may tend to move towards a closed valve condition and the second valve may tend to move towards an open valve condition. When the inertial mass moves in the opposite direction the first and second valves reverse their respective valve conditions. The first valve controls the brakes when the vehicle car is traveling in one direction, and the second valve controls the brakes when the vehicle car is traveling in the opposite direction.

The master control valve 3 receives fluid under pressure at a first input 5 via a line 6 from a hydraulic power supply 4 at supply pressure $P_s$. The fluid at supply pressure $P_s$ is also supplied to inputs 7 and 8 of a front brake valve 9 and a rear brake valve 10, respectively via a line 11. The master control valve 3 includes a return path for fluid to the supply 4 via a line 12, which return path is also common to the front and rear brake valves. The fluid at pilot pressure $P_p$ appearing at the output 13 of the master control valve 3 is applied to the inputs 14 and 15 of the brake valves 9 and 10 respectively for controlling the operation of same.

A direction control signal is applied to the master control valve 3 from a vehicle controller 16. The direction control signal determines whether the first or second valve receives fluid $P_s$ from the supply 4. The direction control signal may have one of two values determined by the direction of travel of the vehicle car. If the direction control signal has the first value the first valve receives fluid $P_s$, and if the direction control signal has the second value, the second valve receives the fluid $P_s$. The direction of travel of the vehicle car is readily determined by the use of a direct current (DC) tachometer or the like as is well known in the art. Suitable control logic in the controller 16 determines the value of the direction control signal as determined by the orientation of the vehicle car relative to the vehicle travel path. That is, if the vehicle car is oriented in one direction relative to the travel path and the orientation of the vehicle car is then changed, with the vehicle car being commanded to travel in the same direction along the travel path as before the change of orientation, the value of the direction control signal must also be changed as to be complementary to its prior value.

The master control valve also receives a reference signal from the vehicle controller 16. This reference signal is a reference braking or deceleration signal which informs the master control valve of the amount of braking needed at a given moment of time. The derivation of a reference signal in a vehicle controller is well known in the art and so will not be set forth in detail. For example, the reference signal may be derived from a potentiometer or the like which provides a direct current (DC) signal output having a magnitude indicative of the desired braking level. When the vehicle car is oriented in one direction relative to the vehicle travel path and the vehicle is to move in a forward direction the reference signal will be at a positive DC level, and when the vehicle car is to move in the opposite direction the reference signal is at a negative DC level. When the orientation of the vehicle car is reversed relative to the vehicle travel path the sign of the reference signal is reversed for the two directions of travel along the vehicle travel path. The reference signal is applied via a line 17 to a first input 18 of a summing amplifier 19, and is also applied by a line 20 to the other cars in a multi-car system when the vehicle controller on the car is used as the master controller. The reference signal is coupled to the other cars by a common train line as is well known in the art. The usual practice is that the head-end car serves as the master controller, and for descriptions that follow it will be assumed that the braking system for the car shown is for a single car which also functions as the master controller for the other cars in the multi-car vehicle system. The second input 20 of the summing amplifier 19 receives a direct current signal from a demodulator 21 which demodulates the alternating current signal output from a coupler transducer 22 which is located in and forms part of the coupler on one end of the vehicle car. The transducer 22 senses a coupling force acting on the coupler and provides a signal having a phase and amplitude which is indicative of this coupling force. If this coupling force tends to accelerate the vehicle car, the signal provided to the input terminal 20 is at a level which tends to cause the braking system to release the brakes on the vehicle car so the coupling force may be reduced to zero. Conversely, if the sensed coupling force tends to decelerate the vehicle car the signal applied to the terminal 20 is at a level which tends to cause the braking system to apply the brakes on the vehicle car so the coupling force may be reduced to zero. The input terminal 23 of the summing amplifier 19 receives a signal input from a demodulator 24 which is provided an alternating current signal input from a coupler transducer 25 which forms part of the coupler on the other end of the vehicle car. This coupler transducer and demodulator system operates in a like manner to the coupling system formed by the demodulator 21 and transducer 22. It follows therefore that the signal applied to the input terminal 23 must be inverted by the summing amplifier 19 since the coupling forces sensed by the respective transducers are opposite when providing the same polarity output. That is, when the transducer 22 senses a coupling force which tends to accelerate the vehicle, the transducer 22 provides an output signal which is substantially the same as the output from the transducer 25 when latter transducer senses a coupling force which tends to decelerate the vehicle. This will be explained in more detail later. The summing amplifier 19 provides an output signal to an input 26 of the master control valve 3. This signal is a modified reference signal for controlling the movement of the inertial mass in the master control valve. It may be seen that if the vehicle car is operating as a single unit that there is no signal input to the terminals 20 and 23, and the modified reference signal applied to the master control valve is therefore substantially identical to the reference signal appearing at the output of the vehicle controller. If however, the vehicle car is operating in a multi-car vehicle system the signal inputs to the terminals 20 and 23 are indicative of the coupling forces acting on this vehicle car, with the idea being to reduce the sum of these coupling forces to zero such that each vehicle car is supplying its own braking effort as a function of the sensed coupling forces. As will be explained later, if one of the vehicle cars loses its brakes the other vehicle cars in the system pick up the braking effort required for bringing the multi-car vehicle to a smooth stop in relation to the sensed coupling forces.

The fluid at pilot pressure $P_p$ appearing at the output 13 of the master control valve varies from 450 to 1200 pounds per square inch (psi). The vehicle car brakes are applied when this pressure is at 450 psi and the brakes are released as the pressure increases to 1200 psi when the braking effort is then essentially zero. The brake valves 9 and 10 respond to the fluid at pilot pressure $P_p$ such that when the pilot pressure is 450 psi the brake pressure $P_b$ is substantially 1500 psi, with $P_b$ decreasing to zero psi when $P_p$ reaches 1200 psi. It is seen therefore that as $P_p$ increases $P_b$ decreases and vice versa. The brake valves 9 and 10 receive a slip spin signal from the controller 16 via lines 27 and 28, respectively. Whenever the slip spin signal is present the brakes are released. The output fluid at brake pressure $P_b$ from the front brake valve 9 is applied to brake cylinder 29 and 30 for controlling their respective operations. These cylinders may for example be situated and function with the two wheels on the front of the vehicle car. $P_b$ from brake valve 10 is supplied to brake cylinders 31 and 32 which function with the brakes situated on the two rear wheels of the vehicle car.

Essentially the braking system disclosed is comprised of a valve means which includes first and second valves. An inertial mass is also included which controls the valve condition of the first and second valves. The first valve moves toward one valve condition and the second valve moves toward the opposite valve condition in response to the inertial mass moving in one direction, with the first and second valves reversing respective valve conditions in response to the inertial mass moving in the opposite direction. The inertial mass moves in either the one or the opposite direction in response to the vehicle decelerating, and the inertial mass is also responsive to a provided reference signal which has a magnitude indicative of the desired braking effort for the vehicle. When the reference signal changes in one sense, the inertial mass moves in the one direction, and in response to the reference signal changing in the opposite sense the inertial mass moves in the opposite direction. The brakes on the vehicle car are applied an amount determined by the respective valve conditions of the first and second valves as controlled by the inertial mass.

Figure 2:
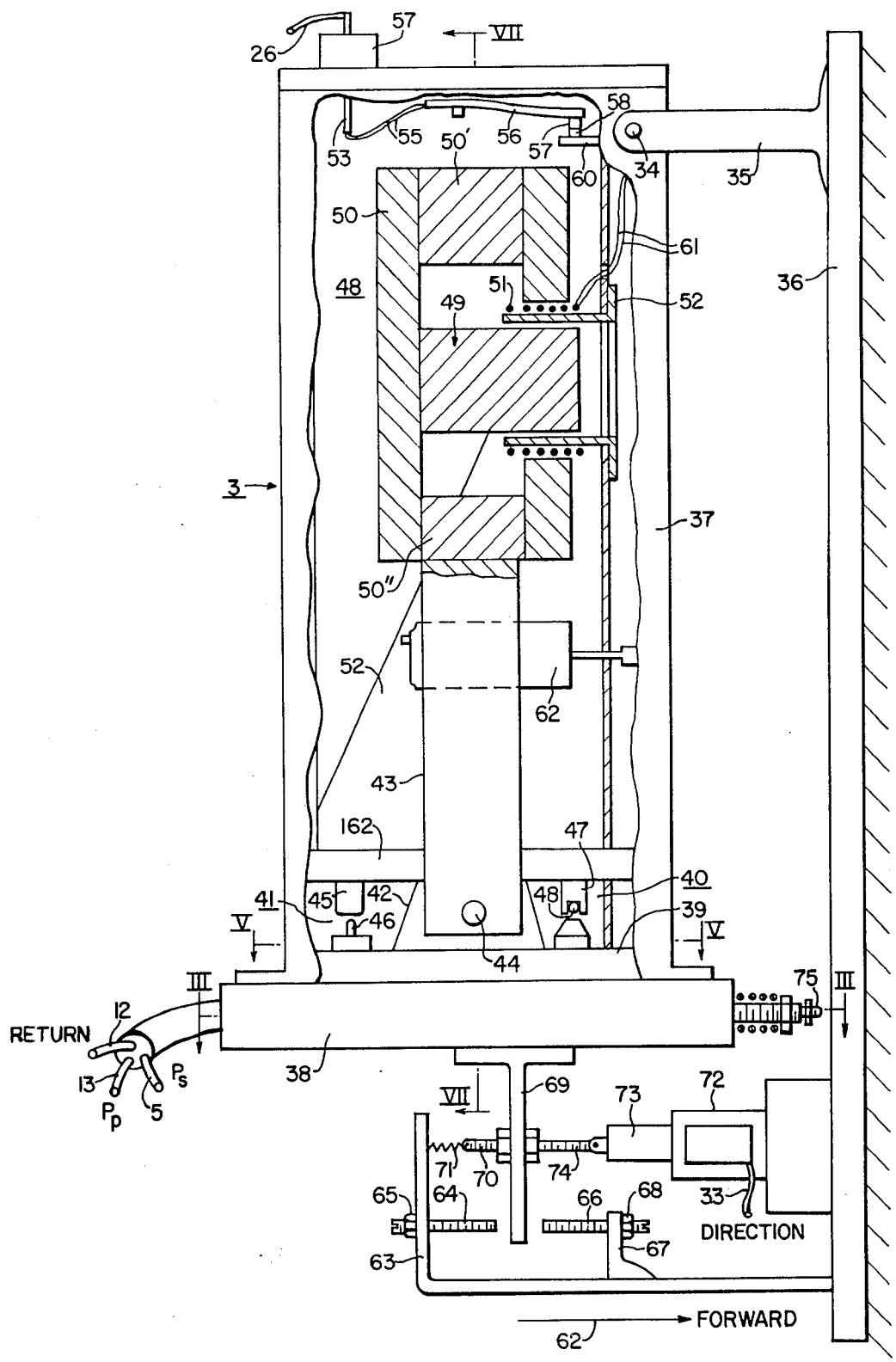
FIG. 2 is a schematic representation of a master control valve suitable for use in a vehicle braking system as illustrated in FIG. 1.
Figure 6:
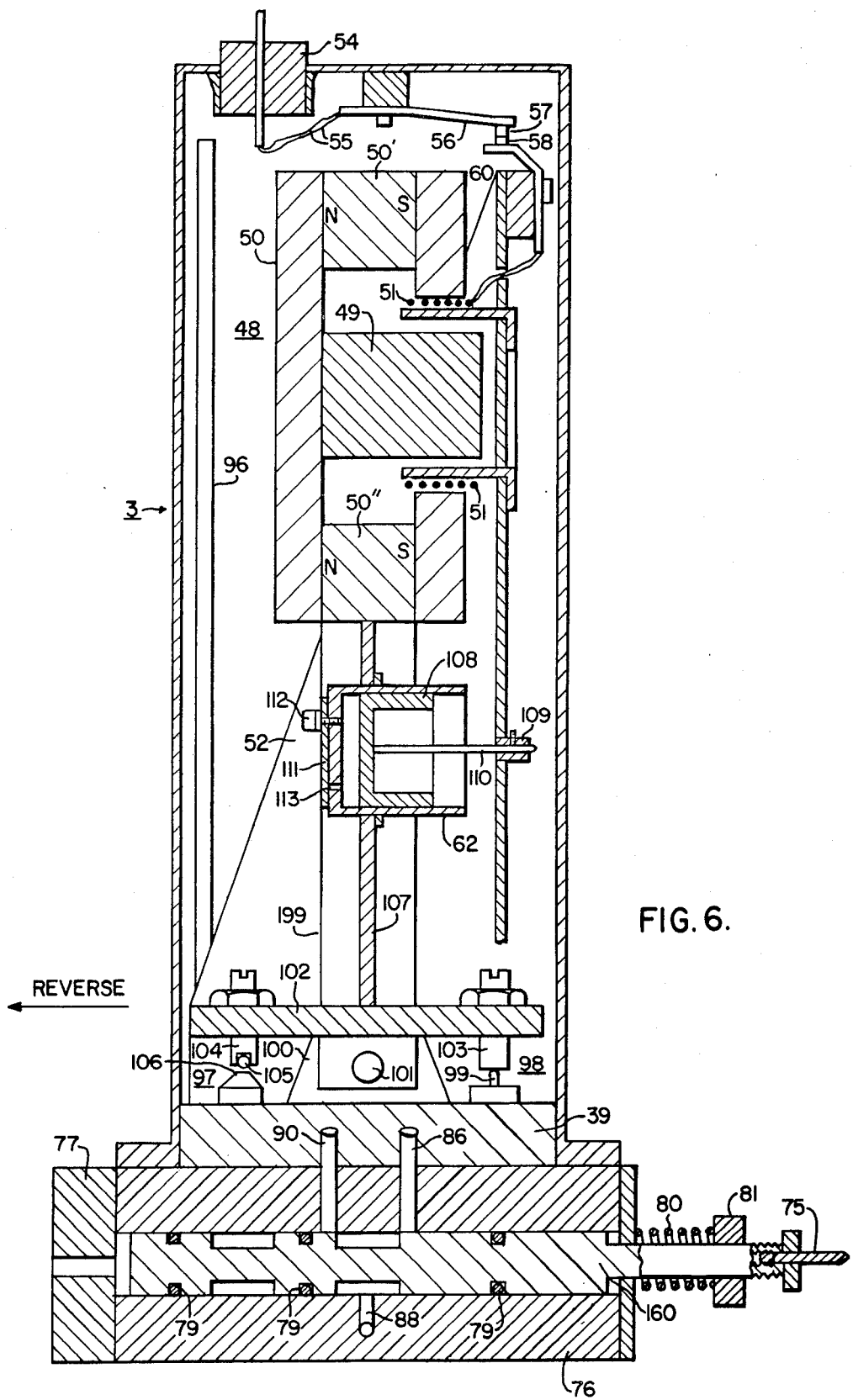
FIG. 6 is a vertical section of FIG. 2 defined by the section line VI—VI of FIG. 3 illustrating the reverse control valve portion of the master control valve.

FIG. 2 illustrates in more detail the master control valve 3 set forth in FIG. 1. The valve 3 is pivotally mounted by a pin 34 and a bracket assembly 35 to a framework 36 of the vehicle car. A housing 37 is secured to a direction valve 38 portion of master control valve 3 by suitable fastening means such as bolts (not shown). A base member 39 is secured to the direction valve 38 and has placed therein a pilot valve assembly 40 and a balance piston assembly 41. A support member 42, which is mounted on base member 39, has an arm 43 pivotally attached thereto by a pin 44. An arm 162 is attached to the arm 43 for rotational movement therewith. A plunger mechanism 45 attached to the arm 162 contacts a piston assembly 46 of the balance piston 41 when the arm 43 rotates in a counterclockwise direction. A plunger assembly 47 attached to the arm 162 includes a valve occluding means such as a ball 48 is seated in the valve seat of the valve 40 when the arm 43 is rotated in a clockwise direction. The function of the valve 40 and the piston assembly 41 will be described in more detail shortly. A pilot valve and balance piston assembly similar to that illustrated is situated directly behind the assemblies shown with their positions reversed, as is more clearly illustrated in FIG. 6. An inertial mass 48 is comprised of a U-shaped steel member 50, which includes legs 50' and 50'' which comprise permanent magnets, and which is attached to the arm 43 and an arm 199 as illustrated in FIG. 6. A soft iron core member 49 is also attached to the member 50. It is seen that the arm 43 and the inertial mass 48 function as an inverted pendulum since the center of gravity of the system is above the pivot point 44. A voice coil assembly 51 is mounted on a support bracket 52, with the voice coil 51 being wouond such that the iron core 49 moves towards the coil 51 as the arm 43 rotates in a clockwise direction and moves away from the coil 51 when the arm 43 rotates a counterclockwise direction. The coil 51 receives the modified reference signal via a line 26 which is connected to conductors 53 which are seated in an insulated cap assembly 54. Wires 55 are connected between arm 56 and the conductors 53. Contacts 57 of the arms 56 are in contact with contacts 58 of arms 60 which are connected to the coil 51 for energizing same. The contact arrangement is used so that the top of the master control valve may be removed for servicing. As was stated previously if the vehicle car is to travel in a forward direction as illustrated by the arrow 62 the modified reference signal has one sense, namely a positive DC level, and if the vehicle is to travel in a reverse direction the sense of the modified reference signal is opposite, that is a negative DC level. The system is such that if the modified reference signal is zero the vehicle is to be braked and as the reference signal increases in magnitude the vehicle is braked to a lesser extent or not at all. It is to be appreciated that other force transducer systems such as pneumatic systems or the like may be used in the practice of the invention for responding to the reference signal. A damping mechanism such as a dashpot 62 is mounted on the arm 43 for rotationally damping the movement of the arm 43. The inverted pendulum system shown is operational in the fluid medium supplied to and passed from the valve system of the master control valve.

The direction valve 38 controls the application of supply fluid at pressure $P_s$ to the master control valve and the removal of fluid at pilot pressure $P_p$ from the master control valve. The master control valve is shown in a static or at rest position. Normally, the master control valve is pivoted either to the left or to the right, as will be explained shortly. A bracket support assembly 63 is secured to the vehicle frame 36 by suitable fastening means such as bolts (not shown). A stop member 64 is adjustable within the frame 63 and is locked in place by a nut 65 which may be adjusted to position the end of member 64 a predetermined distance from the bracket 63. Another stop member 66 is adjustable within a bracket 67 and is locked in place by an adjusting nut 68 which determines the position of the stop member 66. An arm 69 is secured to the direction valve 38 by suitable fastening means (not shown), and attached to the arm 69 is a member 70 which is connected to the bracket 63 by way of a spring 71. The tension of spring 71 is sufficient to pull the arm 69 in a leftward direction such that it is pressed against the stop member 64, thereby rotationally biasing the arm 43 in a clockwise direction under the force of gravity which tends to seat the ball 48 in the valve seat of the valve 40. A solenoid 72 is secured to the vehicle frame 36 by suitable fastening means (not shown), which solenoid is energized via the line 33 by the direction signal. The solenoid arm 73 is attached to the arm 69 by an adjustment screw 74. When the solenoid 72 is energized by the direction signal the arm 73 is pulled toward the right overcoming the bias force of spring 71, and the arm 69 is brought to rest against the stop member 66. The arm 43 of the inverted pendulum then rotates in a counterclockwise direction rotationally biasing the arm 43 thereby tending to remove the ball 48 from the valve seat of the valve 40. The rotation of the master control valve in either instance is on the order of 11°. It is seen that when the solenoid 72 is energized that a plunger 75 on the direction valve 38 is pressed against the vehicle frame 36, thereby changing the valve condition of the direction valve 38 relative to its valve condition when the solenoid 72 was deenergized. The detailed functioning of the direction valve 38 will be explained shortly.

When the vehicle car is traveling in the forward direction as indicated by the arrow 62 the solenoid 72 is energized, overcoming the stiffness of the spring 71 which in turn urges the arm 69 against the stop member 66. The plunger 75 on the direction valve 38 places the valve 38 in such a condition that fluid at supply pressure $P_s$ is supplied to the pilot valve 40 and the balance piston 41. The pilot valve and balance piston for reverse direction of travel (as shown in FIG. 6) receives no fluid at this time. Fluid at pilot pressure $P_p$ is transmitted from the direction valve by way of the valve 40 at this time, as will be made more clear shortly. If the vehicle is traveling in the reverse direction, solenoid 72 is deenergized, the arm 69 is urged against the stop member 64 by the spring 71 and the valve 40 and the balance piston 41 for the forward direction of travel receives no fluid. The pilot valve and balance piston assembly for the reverse direction of travel as shown in FIG. 6 now receives fluid for controlling the brake. The operation of both valve and piston assemblies will be described in detail shortly.

Figure 3:
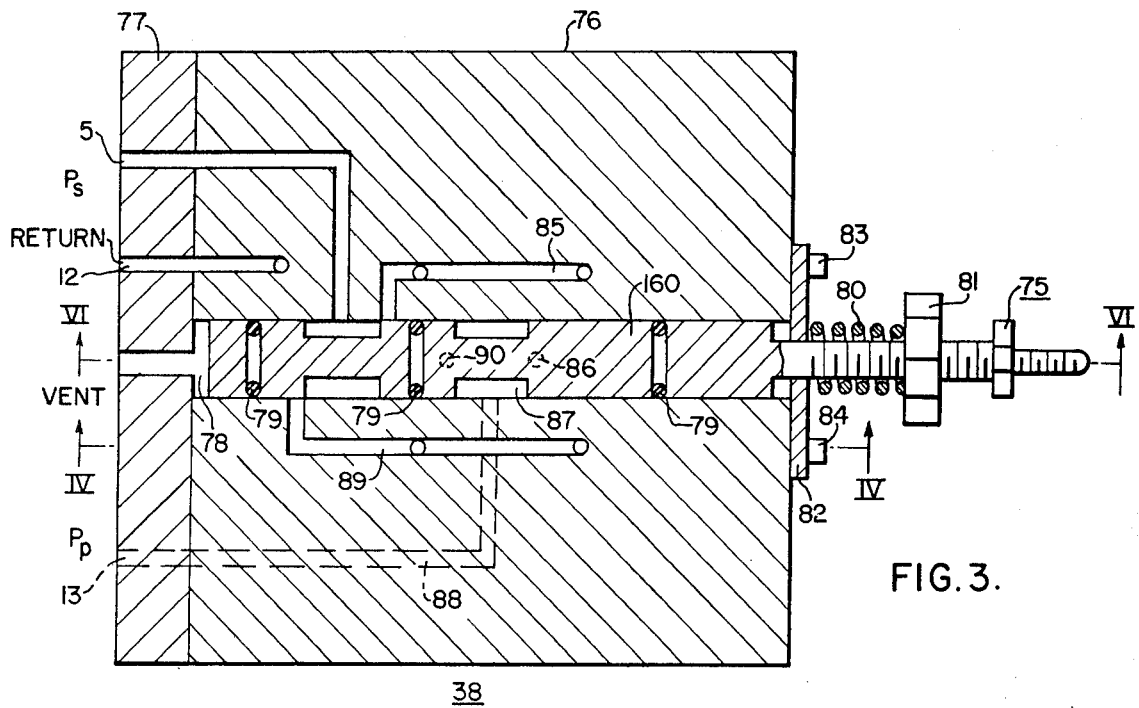
FIG. 3 is a horizontal section taken along the line III—III of FIG. 2 illustrating the direction control valve portion of the master control valve.

Refer now to FIG. 3 which is a section of the direction valve 38 taken along the line III—III of FIG. 2. The valve 38 may take the form of a spool valve and is comprised of a valve housing 76 which is attached to a manifold assembly 77 by suitable fastening means such as bolts (not shown). It is to be appreciated that an O-ring assembly or the like is positioned between the valve housing 76 and the manifold assembly 77 such that there is no fluid leakage. A spool assembly 160 comprised of three lands is attached to the plunger mechanism 75. The spool assembly 160 is shown at an at rest or static position for a condition similar to that illustrated in FIG. 2. The spool assembly 160 is slidably engaged in a bore 78 within the housing 76 and is sealingly fitted therein by O-rings 79. When the solenoid 72 is deenergized the spring 80 as controlled by the adjustment nut 81 urges the spool assembly 160 against a stop member 82 which is sealingly secured to the housing 76 by bolts 83 and 84, respectively. It is seen that when the piston is to the right-most position, as just described, the input 5 which supplies supply fluid at pressure $P_s$ communicates with a passage 85 via the bore 78 which passage is connected to the reverse valve assembly on the master control valve as will be explained shortly. The pilot pressure $P_p$ fluid output from the reverse valve assembly of the master control valve is returned to a port 86 communicating with a chamber 87 and through a passage 88 to supply fluid at pilot pressure $P_p$ at the output 13 which is connected to the brake valves. Conversely, when the solenoid 72 is energized the arm 75 is pressed against the vehicle frame 36 which urges the spool assembly 160 leftward against the manifold 77 such that the $P_s$ input 5 is coupled to a passage 89 which communicates with the forward valve portion of the master control valve as will be explained shortly. A port 90 is now in communication with the forward section of the master control valve and returns fluid at pilot pressure $P_p$ to the cavity 87, through passage 88 to the output 13, and in turn to the brake valves.

It is seen therefore that when a direction signal has one value namely zero volts the solenoid 72 is deenergized and the direction valve 38 supplies fluid at supply pressure $P_s$ to the master control valve reverse valve assembly via the passage 85 and receives fluid at pilot pressure $P_p$ via the port 86, which is transmitted to the chamber 87 and through the passage 88 to the brake valves via the output 13. Conversely when the direction signal is at a second level namely a positive voltage the solenoid 72 is energized and the direction valve assumes a second valve condition and the fluid at supply pressure $P_s$ is supplied to the direction valve forward valve assembly via the passage 89, and receives fluid at pressure $P_p$ from the master control valve through the port 90, which is transmitted to the chamber 87, and through the passage 88, and to the brake valves via the output 13.

Figure 4:
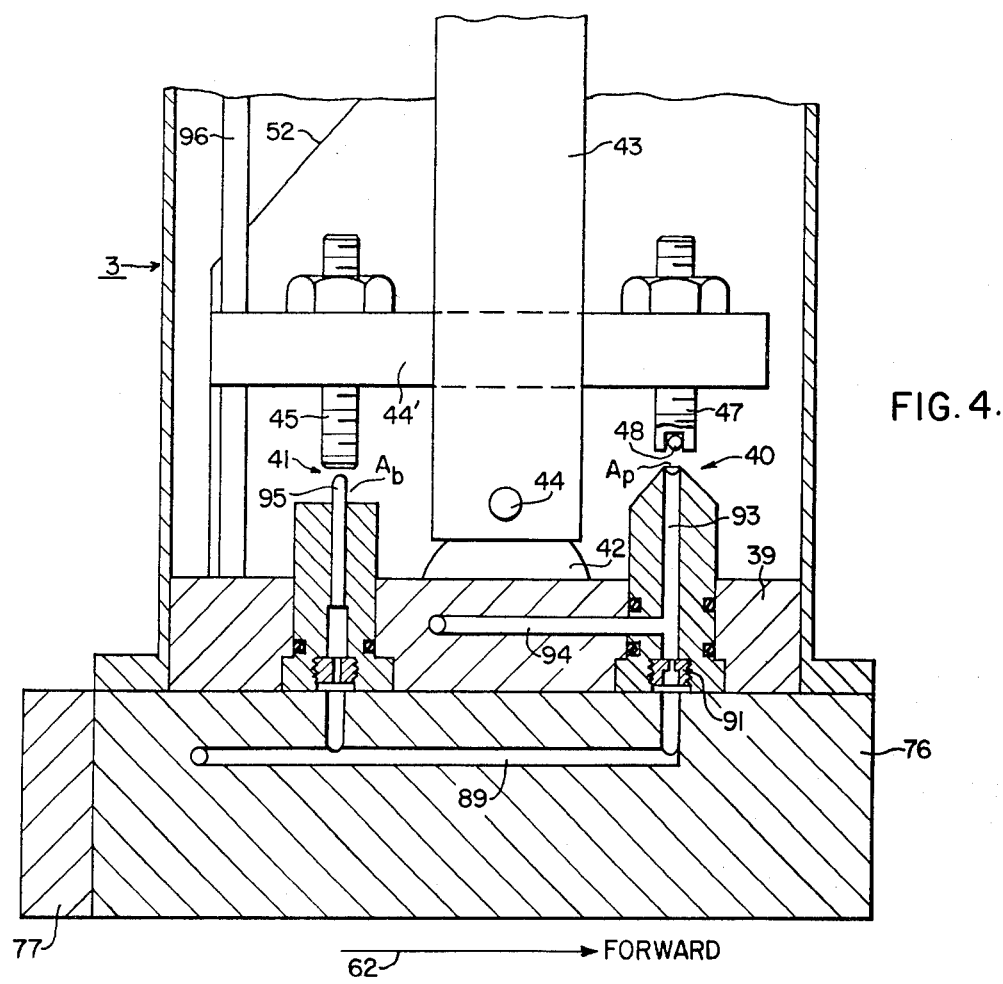
FIG. 4 is a partial vertical section of FIG. 2 defined by the section line IV—IV of FIG. 3 and illustrating the forward control valve portion of the master control valve.

Refer now to FIG. 4 which illustrates the first valve section, namely the forward valve section of the master control valve 3. It is assumed that the vehicle is to travel in a forward direction as illustrated by the arrow 62 and that the solenoid 72 is energized such that the arm 75 of the direction valve 38 is pressed against the vehicle frame 36 (see FIG. 2). The direction valve is in such a condition therefore that the spool assembly 160 is moved in a leftward direction and is pressed against the manifold assembly 77, such that fluid at the supply pressure $P_s$ appearing at the input 5 is communicated through the passage 89 of the direction valve (see FIG. 3) and is then supplied to the master control valve. Returning to FIG. 4, the passage 89 is receiving fluid at pressure $P_s$ at this time which is supplied to a metering orifice 91 of the pilot valve assembly 40 and to a balance piston assembly 41. The fluid passed by the metering orifice 91 is at the pilot pressure $P_p$ for the forward direction of travel. This passes through the throat 93 and the valve seat annulus of the valve 40 and communicates with the interior of the housing of the master control valve 3. Fluid at pilot pressure $P_p$ is also communicated through a passage 94, which is the pilot pressure output for the forward direction of travel, and which communicates with the port 90 of the direction control valve 38 (see FIG. 3).

When the system is biased for forward direction of travel, the arm 43 is rotationally biased in a counterclockwise direction such that the ball 48 is removed from the valve seat of the valve 40 and the assembly 45 is in contact with the balance piston 95. In such a condition the pilot pressure in the passage 94 is essentially 450 psi which is a minimum pilot pressure which results in 1500 psi pressure output from the brake valve causing the brakes to be applied. This is a failsafe consideration for system operation such that the vehicle brakes are always applied until the rotational bias applied is overcome by sufficient reference current being applied to the voice coil of the inverted pendulum. It is seen therefore that in absence of current being applied to the voice coil the brakes are applied on the vehicle. Assume that current is now applied to the voice coil such that the arm 43 is caused to rotate in a clockwise direction such that the ball 48 is seated in the valve seat of the valve 40. When this occurs the pilot pressure in the passage 94 increases to a maximum value, on the order of 1200 psi which results in a decrease of brake pressure $P_b$ such that the brakes are released on the vehicle. When the vehicle car is moving, and has excessive deceleration for one reason or another it is seen that the excessive deceleration force causes the arm 43 to rotate in a clockwise direction which tends to cause the ball 48 to be seated which in turn increases the pilot pressure in the passage 94 which causes pilot pressure to increase therefore releasing the brakes as will be explained in more detail in relation to FIG. 8. This type of action results in smooth braking effort for bringing the vehicle to a smooth stop.

The balance piston 41 produces a force on the arm 43 which tends to oppose the torque exerted on the arm 43 by the pilot pressure applied against the ball 48. This in part results in the brake pressure being substantially unaffected by changes in supply pressure as will be explained later. The balance piston 95 is self-centering as it is tapered such that the diameter of the bottom portion is on the order of 1,000th or 2,000th of an inch less than the diameter of the top portion. The ball 48 is also self-centering in the valve seat due to the hydrodynamic forces acting on it. The area $A_p$ which is the area of the opening at the top of throat 93, and the area $A_b$ which is the area of the balance piston each have a predetermined size for reasons which will subsequently be set forth.

It is seen for forward movement of operation that the first valve assembly, namely the forward valve assembly, is receiving fluid from the direction control valve via the passage 89. When the forward valve is in the first valve condition, namely open, the pilot pressure is at a minimum value such that the vehicle brakes are applied, and conversely when the valve is in a second valve condition, namely closed, the pilot pressure increases to a maximum value and the vehicle brakes are released. A stand pipe 96 is illustrated in FIG. 4, which pipe returns fluid from the interior of the master control valve housing to the return output 12 of the direction control valve (see FIG. 3).

Figure 5:
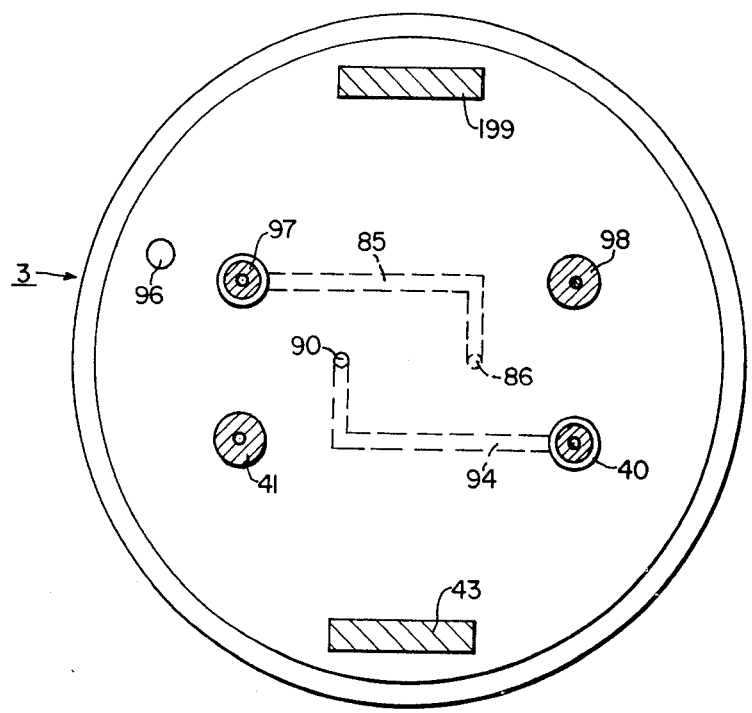
FIG. 5 is a horizontal section taken along the line V—V of FIG. 2 illustrating a top view of both the forward and reverse control valve portions of the master control valve.

FIG. 5 is a section taken along the line V—V of FIG. 2 such that a top view may be seen of the first and second valve assemblies, namely the forward and reverse valve assemblies. The forward pilot valve 40 and the forward balance piston 41 are illustrated, with the forward valve 40 shown in communication with the pilot pressure passage 94 which communicates with the port 90 of the direction control valve. The reverse pilot valve 97 is shown in communication with the passage 85 which communicates with the port 86 of the direction valve. Also shown is the balance piston 98 for the reverse valve assembly. Arms 43 and 199 which support the inertial mass are also illustrated. It now may be more readily seen how the forward valve 40 receives supply pressure $P_s$ only when the solenoid 72 is energized, and conversely the reverse valve 97 receives supply pressure $P_s$ only when the solenoid 72 is deenergized. If however the orientation of the vehicle relative to the vehicle travel path were changed, likewise the energization of the solenoid 72 would be changed. That is, solenoid 72 would be deenergized if the vehicle were to travel in the forward direction and would be energized if the vehicle were to travel in the reverse direction along the vehicle travel path.

In FIG. 6 there is illustrated the second valve section of the master control valve assembly, namely the reverse section. An arm 199 is pivotally mounted on a support member 100 by way of a pin 101. Attached to the arm 199 is an arm 102 which has a plunger mechanism 103 which engages the balance piston 99 of the balance piston assembly 98 when the arm 199 is rotated in a clockwise direction. Included is a plunger mechanism 104 having a valve occluding means such as a ball 105 therein which is seated in the valve seat of the valve assembly 97 when the arm 199 is rotated in a counterclockwise direction. A webb 107 is formed between the arm 43 and the arm 199 for supporting the dashpot 62. A piston 108 is housed in the body of the dashpot 62 for movement therein, and attached thereto is a stiff wire 110 which is secured to support member 52 by means of a securing means 109. The piston 108 moves inwardly in the body of the dashpot when the pendulum rotates in a clockwise direction, and moves outwardly when the pendulum rotates in a counter-clockwise direction. A bimetal plate 111 is attached to one end of the dashpot 62 by means of a screw 112. A small parallel plane opening formed by the plate 111 and an opening 113 allows fluid to be expelled from the dashpot. The bimetal strip 111 responds to the temperature of the fluid surrounding the dashpot for permitting a different amount of fluid to escape from the opening. This results in damping the inverted pendulum substantially independent of the temperature of the fluid. The time constant for the damping system will be on the order of one second or so which results in good system stability.

When the vehicle car decelerates while traveling in the reverse direction the inverted pendulum tends to rotate in the counterclockwise direction due to the vehicle car deceleration thereby tending to close the pilot valve 97. The force acting on the pendulum due to the deceleration is the mass ($m$) of the pendulum times the deceleration ($a$) and the force is acting in the same direction as the REVERSE arrow pointing leftward at the bottom of FIG. 6. The mass ($m$) is on the order of 5 pounds or so. Since the pendulum is rotationally biased in a clockwise direction, the bias force is $m \theta g$ acting in the direction opposite to the deceleration force, where $m$ is the mass, $\theta$ is the angle of rotation, and $g$ is gravity. The current flow through the coil 51 caused by the modified reference signal must be in a direction such as to produce a force tending to aid the rotation of the inverted pendulum due to deceleration. The force arises by interaction of the voice coil current and the radial air gap field. It follows that the sum of the deceleration force and the reference force must tend to equal the bias force, that is the sum of the forces equals zero, to result in smooth deceleration and braking of the vehicle car. It is readily apparent that the forces acting on the pendulum and the current flow through the coil are complementary for forward direction of travel.

Figure 7:
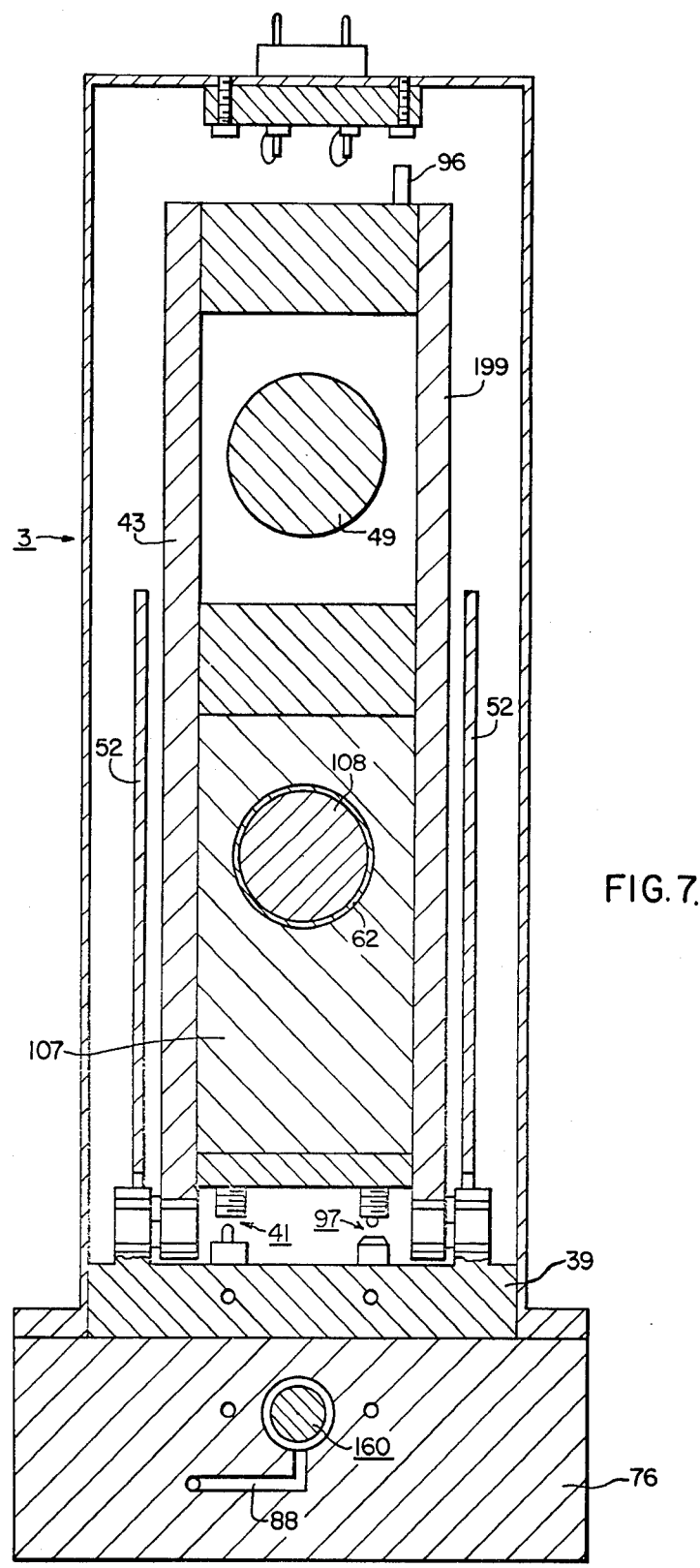
FIG. 7 is a vertical section taken along the lines VII—VII of FIG. 2 which section is in a plane perpendicular to the plane of the section illustrated in FIG. 6.

FIG. 7 is another sectional view of the master control valve which is essentially a side view wherein the balance piston 41 for the forward system is seen and the pilot valve 97 for the reverse system is seen. This helps to more clearly illustrate the fact that one pilot valve tends to close when the other pilot valve tends to open and vice versa.

Figure 8:
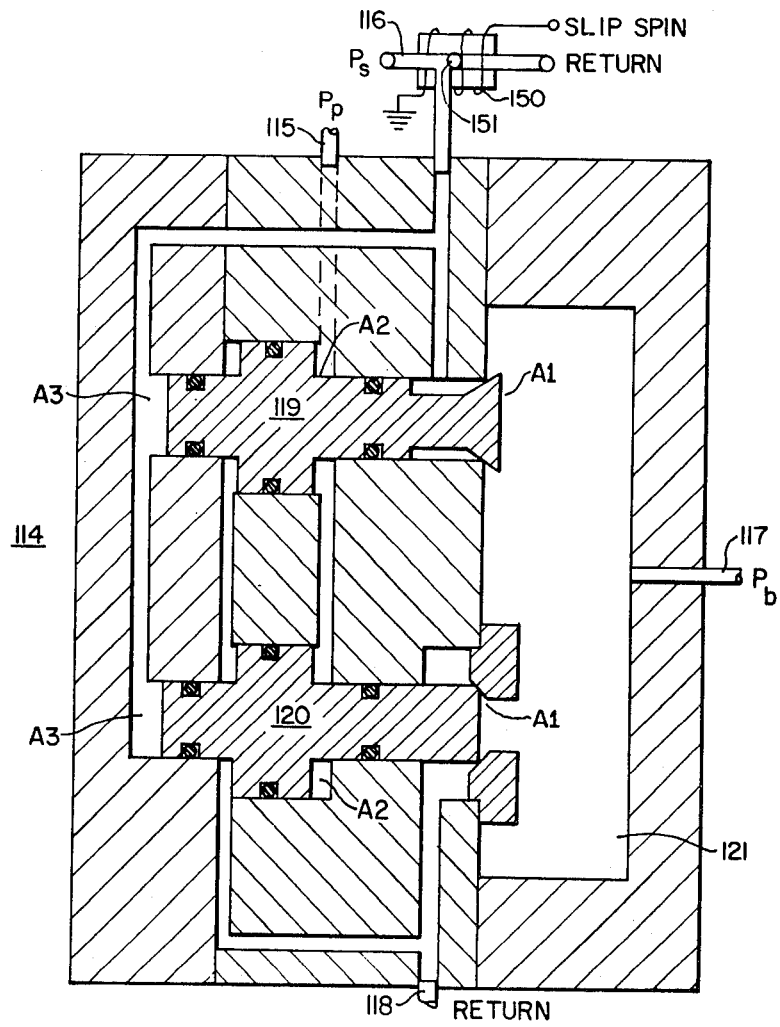
FIG. 8 is a schematic diagram of a brake valve which may be used as the brake valve which is generally set forth in FIG. 1.

Refer now to FIG. 8 which illustrates a brake valve 114 which is suitable for use as the brake valves 9 or 10 of FIG. 1 when practicing the present invention. The brake valve 114 receives fluid at pilot pressure $P_p$ at an input port 115, and fluid at supply pressure $P_s$ at an input port 116, with fluid at brake pressure $P_b$ being supplied at an output port 117. The return of fluid from the brake valve to the hydraulic power supply is from port 118. The brake valve comprises an inlet valve 119 and an exhaust valve 120. These valves are in equilibrium except during transient pressure changes. An increase in pilot pressure $P_p$ results in a decrease in brake pressure since the exhaust valve 120 opens due to the increase in pilot pressure which results in fluid escaping from cavity 121 through the return line to the output port 118. When enough fluid escapes such that the brake pressure has decreased sufficiently, the system returns to equilibrium. If on the other hand pilot pressure tends to decrease, the inlet valve 119 tends to open allowing fluid at supply pressure $P_s$ to enter the cavity 121. Once the brake pressure then increases to a sufficient value, this pressure causes the inlet valve 119 to close returning the system to equilibrium. If a slip spin signal is present, the coil 150 is energized pulling the ball 151 towards input 116 blocking passage of fluid $P_s$ to the brake valve and venting areas $A_3$ to the return thereby opening exhaust valve 120 which drains fluid from cavity 121 thereby releasing the brakes on the vehicle car.

The choice of the areas designated A1, A2, and A3 on the inlet and exhaust valve results in the brake pressure $P_b$ being uneffective by changes in supply pressure $P_s$. This is so due to the areas $A_b$ and $A_p$ on the master control valve, as set forth in FIG. 4, also being properly chosen. This is more clearly seen in relation to the following mathematical expressions which show that the brake pressure $P_b$ is independent of supply pressure $P_s$ if the previously mentioned areas are properly chosen.

Force on pendulum due to $P_s$ and $P_p$ (See FIG. 4)

$$F = P_p A_p - P_s A_b \tag{1}$$

relation of pressures acting on brake valve (see FIG. 8)

$$P_s A_3 = P_p A_2 + P_b A_1 \tag{2}$$

solving for $P_b$ from (2)

$$P_b = \frac{P_s A_3 - P_p A_2}{A_1} \tag{3}$$

solving for $P_p$ from (1)

$$P_p = \frac{F + P_s A_b}{A_p} \tag{4}$$

substitute (4) in (3)

$$P_b = P_s A_3 - \frac{F + P_s A_b}{A_p} A_2 \tag{5}$$

$$= \frac{P_s A_3}{A_1} - \frac{P_s A_b A_2}{A_p A_1} - \frac{F A_2}{A_p A_1}$$

$$= \frac{P_s}{A_1}\left[A_3 - \frac{A_b A_2}{A_p}\right] - \frac{F A_2}{A_p A_1}$$

It is seen that $P_b$ dependency on $P_s$ may be eliminated if the following relationship holds true from (5):

$$A_3 - \frac{A_b A_2}{A_p} = 0 \tag{6}$$

This occurs if the following holds $$\frac{A_3}{A_2} = \frac{A_b}{A_p} \tag{7}$$

When (7) is met, it follows from (5) that $$P_b = -\frac{F A_2}{A_p A_1} \tag{8}$$

From the above it is seen that the brake pressure ($P_b$) is not effected by variations in supply pressure ($P_s$) when the ratio of $A_3/A_2$ on the brake valve is equal to the ratio of $A_b/A_p$ on the master control valve. This therefore obviates the need for an expensive regulated source of fluid when practicing the present invention.

Figure 9:
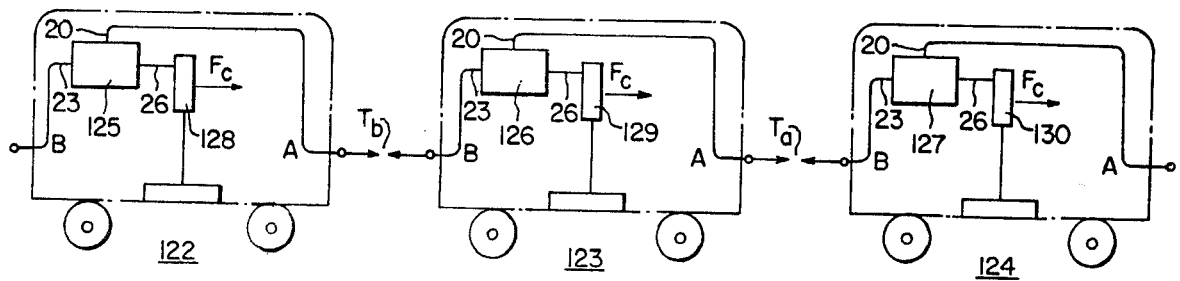
FIG. 9 illustrates a multi-car vehicle system according to the present invention.

Refer to FIG. 9 which illustrates a multi-car vehicle comprised of vehicle cars 122, 123 and 124. Each of these vehicle cars includes a vehicle braking system as set forth in FIG. 1, with the control braking system being illustrated by the blocks 125, 126 and 127 respectively in the vehicle cars 122, 123, and 124. The inverted pendulum for each vehicle car is shown external to the control braking block for clarity of explanation and is numbered as 128, 129 and 130 in the respective cars. The cars are coupled together in a conventional manner with each coupler in each car including a force transducer such that the coupling forces acting on the respective couplers may be sensed for modifying the braking reference signal applied to the master control valve in each vehicle car. The coupling forces acting on the respective cars are related to a force $F_c$ as follows:

For car 123;

$$F_c = C(T_a - T_b) \tag{1}$$

For car 122;

$$F_c = +C(T_b) \tag{2}$$

For car 124;

$$F_c = -C(T_a) \tag{3}$$

Where $F_c$, which acts on the inverted pendulum, is proportional to the resulting coupling force acting on a given car. $T_a$ and $T_b$ are coupling forces acting on the cars as set forth in FIG. 9. For example $T_a$ is the coupling force acting between cars 123 and 124, and $T_b$ is the coupling force acting between the cars 122 and 123 and $C$ is a system constant. Since car 123 has coupling forces acting on each of its respective couplers it follows that the resulting coupling force felt by the vehicle car is the sum of the two forces. The general rule adopted is that a coupling force acting on the front of a vehicle car which tends to accelerate the vehicle car should tend to release the brakes on the vehicle car and vice versa, whereas a coupling force acting on the rear of a vehicle car which tends to decelerate the vehicle car should tend to apply the brakes on the vehicle car and vice versa. Therefore $T_a$ is a positive force for car 123 whereas it is a negative force for car 124, and $T_b$ is a negative force for car 123 whereas it is a positive force for car 122. Since the couplers on each end of a given vehicle car are identical in construction, it follows that a force tending to produce a tension in the coupler, that is a force acting outwardly from the car would produce like signals at each coupler. Since these forces are opposing it follows that the force $T_b$ for car 123 should be inverted in accord with the force equation for car 123. FIG. 1 illustrates how this is accomplished as the force $T_b$ is sensed by the transducer 25, demodulated by the demodulator 24, and is applied to the inverting input of the summing amplifier 19. On the other hand the coupling force acting on the coupler A is applied to a demodulator 21 and to a noninverting input 20 of the summing amplifier 19 of FIG. 1. It is seen therefore that the summing amplifier 19 performs the mathematical operation set forth by the force equation for vehicle car 123 such that the reference signal applied to the input terminal 18 of the summing amplifier 19 is modified an amount determined by the respective coupling forces act on the car 123 for controlling the movement of the inverted pendulum 129 on the car 123 thereby controlling the amount of braking on the car 123. Similar analysis shows that cars 122 and 124 respond in a like manner. In the event a given car in a multi-car vehicle loses its brakes the other cars will take up the necessary braking by sensing the coupling forces to result in a smooth braking for the vehicle car system. It is seen that the effect of the coupling force feedback is to reduce the coupling forces acting between cars essentially to zero such that each car supplies braking effort proportional to its own mass.

Figure 10:
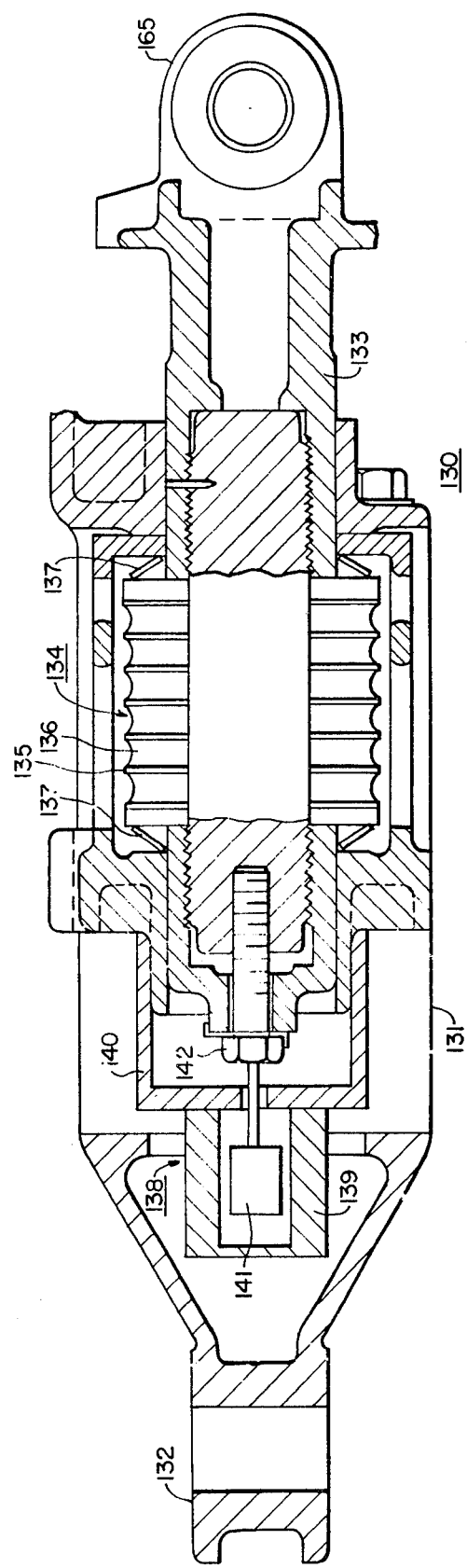
FIG. 10 illustrates a car coupler which includes a force transducer for sensing the coupling forces acting on the coupler, which coupler may be used in a multi-car vehicle system as set forth in FIG. 9.

Refer now to FIG. 10 which illustrates a coupler 130 which may be used in the practice of the present invention. A coupler housing 131 has an end member 132 which is secured to the vehicle car in a well known manner, and a coupling member 165 which is used to couple with a coupler on another vehicle car in a well known manner. A member 133 is slidably mounted in the housing 131 for movement therein depending upon the coupling force acting on the coupler member 165. An elastomeric pad device 134 is comprised of alternate steel plates 135 and rubber sections 136, and at each end thereof belleville springs 137 are mounted between the housing and the elastomeric pad devices for constraining the movement of the member 133 a predetermined amount within the housing 131. A force transducer such as the linear differential transformer 138 has its coil structure 139 secured to the housing 131 by bracket assembly 140. A movable core section 141 is secured to the movable member 133, for movement therewith, by a bolt arrangement 142. The core member 141 therefore is displaced within the coil member 139 an amount determined by the movement of the member 133. The linear differential transformer provides an alternating signal output the phase and amplitude of which is dependent upon the position of the core 141 within the coil structure 139 as will be explained in more detail shortly.

Figure 11:
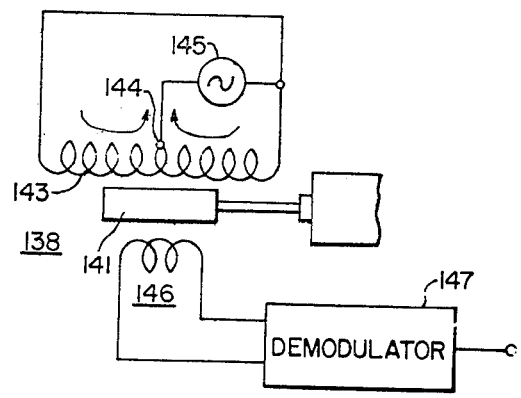
FIG. 11 is a schematic diagram representation of a linear differential transformer which may be used as the force transducer illustrated in FIG. 10.

FIG. 11 illustrates schematically the linear differential transformer 138 set forth in FIG. 10. The transformer 138 has a primary winding 143 with a center tap 144 which is connected to one side of an alternating current source 145, with the other side of the source being connected to the respective ends of the primary winding. The secondary winding 146 of the transformer is connected to the input of a demodulator 147 which may for instance be used as the demodulator 21 or 24 as set forth in FIG. 1. When the core member 141 is centrally positioned as illustrated, which is indicative of a zero coupling force condition, there is essentially no current induced in the secondary winding 146 since the current flow through each side of the primary winding 143 with respect to the center tap 144 produces equal an opposite current flow in the secondary winding 146. If however the core member 141 is moved in a leftward direction, which is indicative of compression of the coupler, there is a greater amount of current flow induced in the secondary 146 in one direction which results in a phase condition which results in the demodulator 147 providing a negative signal output, and when the coupler 141 is pulled outwardly that is in the righthand direction, which is indicative of tension in the coupler, a current flow is produced in the opposite direction in the secondary coil 146, with the demodulator 147 providing a positive direct current output. It is well known in the art how to properly connect the linear differential transformer 138 to the demodulator 147 such that the demodulator 147 provides the proper polarity output signal for required system operation.

In summary a novel master control valve has been disclosed which may form part of an acceleration control braking system for a single vehicle car. In a multi-car vehicle system, the vehicle braking system on each car responds to the coupling forces acting on the respective car for modifying a common reference braking signal for effecting the braking such that the coupling forces acting between cars is substantially reduced to zero.

I claim:

1. In apparatus for controlling the application of brakes on one car of a coupled multi-car vehicle, the combination comprising:

valve means, including first and second valves;

means for causing said second and first valves to move towards one valve condition and the opposite valve condition respectively in response to a sensed deceleration when said vehicle is moving in one direction, and for causing said second and first valves to move towards said opposite valve condition and one valve condition respectively in response to a sensed deceleration when said vehicle is moving in the opposite direction;

means for applying the brakes on said one car in response to said first valve being in said one condition when said vehicle moves in said one direction and in response to said second valve being in said one condition when said vehicle moves in said opposite direction;

means for sensing the coupling forces acting on at least one end of said one car; and means for releasing the brakes on said one car if the sensed coupling forces tend to accelerate said one car, and for applying the brakes on said one car if the sensed coupling forces tend to decelerate said one car.

2. In apparatus for controlling the application of brakes on one car of a coupled multi-car vehicle, the combination comprising:

means for providing a reference braking signal common to each car of said multi-car vehicle and having a magnitude indicative of the desired braking effort for each car;

means for sensing the coupling forces acting on each end of said one car;

means for modifying said reference braking signal for said one car dependent on the sensed coupling forces; and means for braking said one car an amount determined by the magnitude of the modified reference signal.

3. In apparatus for controlling the application of brakes on one car of a coupled multi-car vehicle, the combination comprising:

means for providing a reference braking signal common to each car of said multi-car vehicle which has a magnitude indicative of the desired common braking effort for each car;

means for sensing the coupling forces acting on one end of said one car for providing a first signal having a magnitude indicative of the sensed coupling forces;

means for sensing the coupling forces acting on the other end of said one car for providing a second signal having a magnitude indicative of the sensed coupling forces;

means for summing said reference braking signal with said first and second signals for providing a modified braking signal for said one car; and means for braking said one car an amount determined by the magnitude of said modified braking signal.

4. The combination claimed in claim 3, wherein said means for sensing the coupling forces acting on one end of said one car and said means for sensing the coupling forces acting on the other end of said one car each comprises a force transducer.

5. The combination claimed in claim 4, wherein each said force transducer comprises a linear differential transformer.

6. The combination claimed in claim 5, wherein said means for summing comprises a summing amplifier.

7. The combination claimed in claim 6 including demodulator means connected between each linear differential transformer, and said summing amplifier.

8. The combination claimed in claim 7, wherein said means for braking includes an inertial mass, the movement of which is controlled by said modified braking signal, with the movement of said inertial mass in one direction tending to release the brakes on said one car, and the movement of said inertial mass in the opposite direction tending to apply the brakes on said one car.

* * * * *